United States Patent Office 3,050,104
Patented Aug. 21, 1962

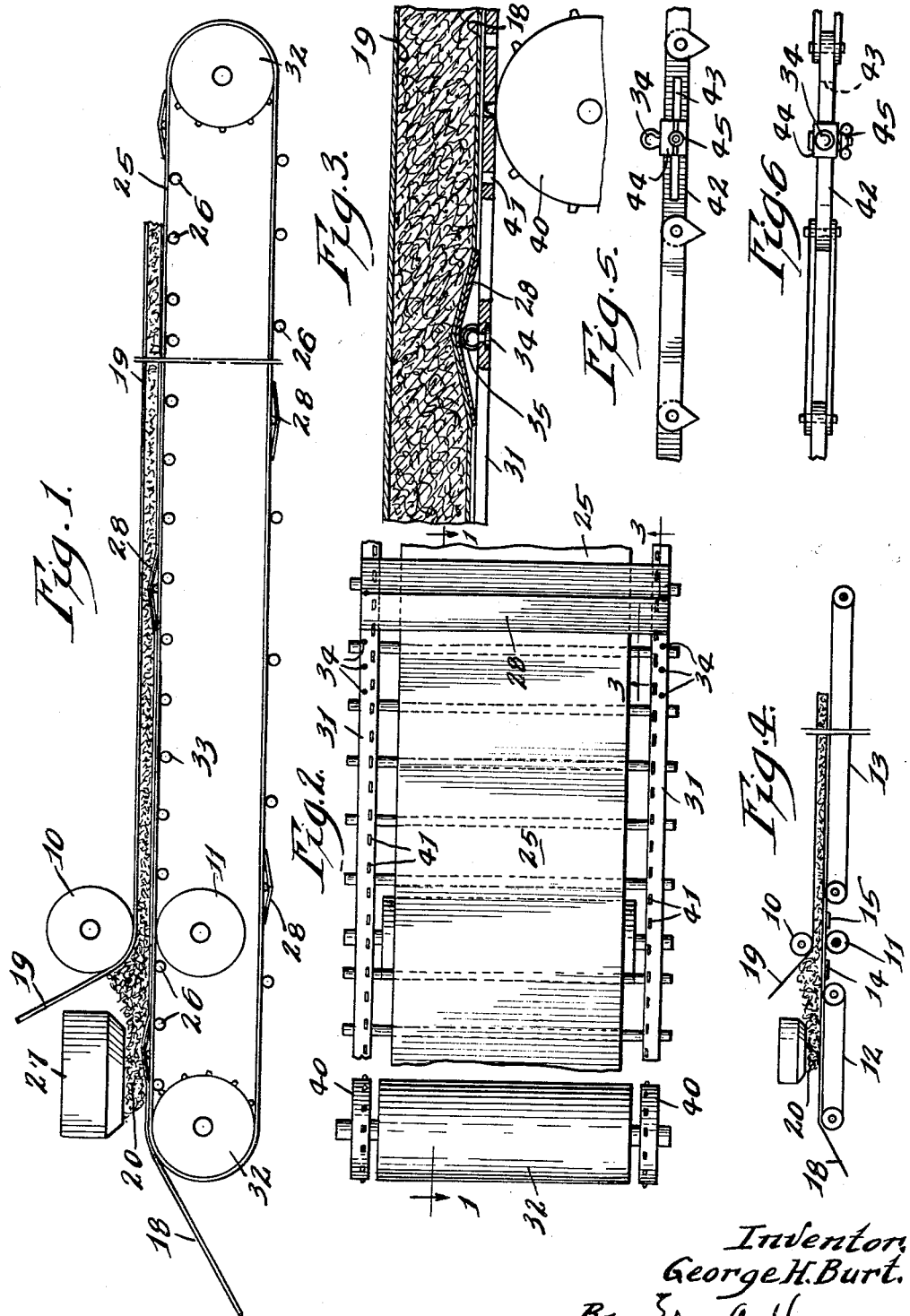

3,050,104
MANUFACTURE OF GYPSUM BOARD
George Henry Burt, Flossmoor, Ill., assignor to The Celotex Corporation, Chicago, Ill., a corporation of Delaware
Filed July 17, 1957, Ser. No. 672,416
5 Claims. (Cl. 156—347)

In the manufacture of gypsum board, whereas there have been shown, in patents, such boards having so called "recessed end edges" and there have been shown and described various means for producing gypsum boards so provided with recessed end edges, there is not as yet available any apparatus for the manufacture of such boards in accordance with current practice of the manufacture of gypsum board products.

This invention relates to an apparatus for the production in accordance with commercial manufacturing practices of gypsum board provided with recessed end edges. The principal feature of the invention hereof is in the provision of an apparatus wherein the board is formed over a deforming element without interfering with the normal operation of the present-day type of apparatus on which gypsum board is manufactured.

The principal objective of the invention is the provision of an apparatus for manufacturing gypsum board having recessed end edges with the further objective of providing such apparatus which may be directly applied to or readily adapted to present-day machines for manufacturing gypsum board.

The inventions hereof are illustrated in the accompanying drawings, wherein FIGURE 1 is a schematic elevation taken on line 1—1 of FIGURE 2 illustrating a gypsum board machine incorporating the inventions hereof;

FIGURE 2 is a fragmentary plan view of the apparatus;

FIGURE 3 is an enlarged detail section;

FIGURE 4 is a schematic illustration of present-day gypsum board machines;

FIGURE 5 is a fragmentary elevation; and

FIGURE 6 is a fragmentary plan view corresponding to FIGURE 5.

In the drawings there is schematically illustrated in FIGURE 4 what is so far as is known the present-day machine on which gypsum wallboard is manufactured by all manufacturers. In this apparatus there are provided a pair of master rolls 10 and 11 which level the board and control its thickness, a forming belt 12, a setting belt 13 and transfer tables 14 and 15 interposed, respectively, between the forming belt and master rolls and between the master rolls and setting belt. 18 and 19 are, respectively, the top and bottom paper or cover sheets of the gypsum board, and 20 indicates the gypsum slurry being supplied to and deposited on the top cover sheet 18.

Whereas the invention hereof may be applied to the present-day gypsum board machine without alteration thereof, as will hereinafter be referred to in more detail, it is preferred that the invention be applied to a slightly modified form thereof. This modification just above referred to is illustrated in FIGURE 1 of the drawing. Actually this does not involve any structural change in the gypsum board machine since the only difference is in that a single combination forming and setting belt 25 is substituted for the separate forming and setting belts as shown in FIGURE 4. Of course, when the continuous belt 25 is substituted for the separate belts 12 and 13, transfer tables 14 and 15 become unnnecessary, although it is probably not essential that they be removed from the machine.

In connection with the substituted belt 25 of FIGURE 1, there is also indicated a series of suporting rolls 26 therefor to maintain the plane of the belt, which supporting rolls are common to all gypsum board machines.

In the illustration of FIGURE 1 a schematic mixer for mixing the slurry which is deposited on the top sheet 18 is shown and identified by numeral 27.

For the purpose of forming the desired recesses at the ends of the gypsum boards there are provided molding strips 28 which extend across the width of belt 25 and are mounted, as will hereinafter be described in detail. It will be evident, as these molding strips 28 in the travel of belt 25 reach the forming portion of the apparatus, that they will be under top cover sheet 18 to deform this sheet suitably to provide end recesses on the ends of boards which result from the cutting of the formed board intermediate the length of such deformed portion. If the sheet 18 is not fully deformed, as molding strip 28 comes underneath the sheet it will quickly conform to the shape of molding strip 28 as the wet gypsum slurry is deposited on the surface of the sheet. As the sheet 18 with the wet gypsum slurry thereon proceeds towards the master rolls, the bottom cover sheet is positioned thereover at the master rolls and the master rolls serve to uniformly distribute the slurry across the width of the machine and to control the thickness of the board formed. The sheet 18 having been deformed before or as the wet slurry is deposited thereon, it is obvious, as the formed sheet reaches and passes beyond the master rolls, that it is fully formed with the desired recess formed in the face side of the formed board.

As the formed board advances on belt 25 the gypsum dehydrates and sets so that as a molding strip separates and leaves the under side of the formed board at the end of the setting belt, the formed recess or depression is stable. It will be understood, of course, that if the board is cut midway of the recess the resulting boards will be provided with end-edge recesses.

In a new installation, preferably, the total length of belt 25 is 360 feet from which it follows that molding strips 28 can be utilized to produce for each complete traverse of belt 25 a plurality of sheets of lengths of six, eight, nine, ten or twelve feet. In utilizing the invention hereof in connection with an installed machine where the length of belt 25 is probably other than 360 feet, it will, of course, follow that for some or maybe for every length of board, for each full traverse of belt 25 there will be an odd size sheet produced. In this case, of course, such sheets of odd length may be accumulated and sold as such, or they may be trimmed to the nearest commercial length or, if very short lengths, such would probably be junked.

To position molding strips 28 across the width of belt 25 there may be provided edge tapes or belts 31 which run on the same conveyer rolls 32 and support rolls 33 as does the belt 25. Molding strips 28 are suitably mounted to edge tapes 31 preferably by separable fasteners, as is shown in enlarged FIGURE 3, wherein separable snap fasteners are illustrated with one portion 34 suitably mounted to tape 31 and the other portion 35 suitably mounted on the under side of molding strips 28. It will be readily understood that by suitably positioning one portion 34 of the snap fastener, properly spaced on tape 31, as illustrated in FIGURE 2, that the molding strips may be readily mounted to produce sheets of various commercial lengths.

To assure that tapes 31 move in unison with belt 25, suitable means may be provided, such as sprockets 40, mounted on the shafts of conveyer rolls 32 with suitable perforations 41 provided in tape 31. It is readily apparent that molding strips 28 will at all times be properly positioned and that they will move in unison with belt 25. Of course, other suitable means may be utilized to maintain proper coordination between tapes 31 and belt 25, so that they advance at all times at the same speed.

As an alternative to tapes 31, link chains may be utilized. In such case the single connecting link 42, every other link in the chain, may be utilized as desired or required for the attachment of molding strips 28. One way in which this can be accomplished is to provide a slot, such as 43, in link 42 to provide for accurate adjustment and to mount on the link an inverted U-shaped member 44 carrying the ball or stud portion 34 of the snap fastener. By providing a wing bolt 45 extending through the legs of the inverted U-shaped member 44, this member may be adjusted and rigidly secured in position by tightening wing bolt 45. Of course, it is to be understood that if the link chain is used a suitable sprocket 40 will be provided.

Assuming that it is desired to utilize the teachings hereof on an installed gypsum wallboard machine, as diagrammatically shown in FIGURE 4, it may be that it would be found that various supports for the various parts of the machine are too close to the edges of belt 25 to permit the installation of tapes 31. It will of course, be understood that in such case it will be necessary to either cut out suitable slots on the inner sides of such support members, or to install new support members in which the supporting legs will be spaced sufficiently from the edges of belt 25 so that the tapes 31 may be installed, and possibly, in old installed machines, it may be necessary to make other mechanical adjustments to adapt the inventions hereof to such machines, but such, of course, are entirely aside from the features of the invention hereof, being merely mechanical design changes or adjustments.

While it is not a preferred form of the invention, it would be possible, of course, to mount the molding strips 28 directly on belt 25. Belt 25 is normally somewhat wider than the usual four-foot wide gypsum wallboard which is formed thereon, and in many cases there would be room to install along the edges of the belt the wall portion 34 of the snap fastener, so that the molding strips may be directly mounted on belt 25. This form of utilization of the invention is, of course, only applicable to the type of machine as illustrated in FIGURE 1 and not to the type illustrated in FIGURE 4. To accomplish the objective of the invention hereof it is necessary that molding strips 28 be in place with the cover 18 overlying such molding strip prior to the passage of the wallboard being formed through the master rolls 10, and preferably the strips 28 should be in place as the stucco slurry is deposited on sheet 18.

The bottom or face sheet and stucco slurry thereon should be formed or molded over the molding strip 28 in the initial stages of the formation of the gypsum board, since after the top sheet has been applied and the edges folded to comprise the formed gypsum wallboard, it is impossible to then form the necessary depression in the face of the board to constitute the desired recessed ends for the board. It is believed that it will be readily understood, after the board has been actually formed, that to provide the recess in the face must, of necessity, likewise deform the back surface of the sheet since, being totally enclosed, there would be no place for the core material to be displaced other than through the formation of a hump on the back of the board. It will be understood, of course, that molding strip 28 is so formed that in effect the recess formed is a double recess, end to end, so that when the continuously formed sheet is cut mid-way of the length of the recess, there is provided a recessed end for each of the adjacent boards resulting.

It will, of course, be understood that the molding strips 28 must be accurately positioned and that they must be maintained in position until the core of the sheet has set. If the spacing of molding strips 28 is not accurate, from mid length of one formed recess to mid length of the next formed recess, there will not be the proper dimension for producing the board of desired length, and also, as will be understood, if the position of a molding strip 28 is not maintained relative the formed board up to the time that the core sets it will result that the recess which is formed will be distorted and will not provide the desired recessed end for the individual board when the formed sheet is severed after setting, according to usual procedure.

There having been above described in detail an apparatus for producing wallboard having recessed end portions, and there having been described the operation of such novel apparatus, I claim:

1. In a gypsum board machine consisting essentially of a machine conveyer on which a gypsum board is formed and set, means feeding cover sheets, means depositing gypsum slurry between the cover sheets and means forming the cover sheets and gypsum slurry in board form; the improvement comprising independent conveyers positioned adjacent each side edge of the machine conveyer and co-extensive therewith, means attaching mold strips adjacent their ends to the independent conveyers, mold strips attached thereby and means driving the independent conveyers in concomitance with the machine conveyer.

2. The combination of claim 1 and wherein the means attaching the mold strips to the machine conveyer comprise cooperating frictionally engaging members mounted respectively to the independent conveyers and to the molding strips.

3. The combination of claim 2 and wherein the cooperating frictionally enegaging members comprise ball and socket-like members respectively 4. The combination of claim 3 and wherein the element of the frictionally engaging members mounted to the independent conveyers are adjustable in the lengthwise direction of the independent conveyer.

5. Apparatus for the manufacture of wallboard comprising, in combination with means depositing settable slurry on a paper sheet positioned thereunder, spaced master rolls positioned to one side of the slurry depositing means, a continuous conveyor on which said paper sheet is carried, one run of which conveyor passes between the spaced master rolls and extends in the opposite direction to beyond the position at which the settable slurry is deposited on the paper sheet carried thereby, separate conveyor means mounted externally of but adjacent each side edge of the continuous conveyor, a transverse molding strip mounted adjacent its ends to the separate conveyor means and means driving the continuous conveying means and separate conveyor means in step, one with the other.

References Cited in the file of this patent

UNITED STATES PATENTS

| | | |
|---|---|---|
| 1,348,898 | Routt | Aug. 10, 1920 |
| 2,044,234 | Walper | June 16, 1936 |
| 2,168,803 | Page | Aug. 8, 1939 |
| 2,246,987 | Roos | June 24, 1941 |
| 2,537,509 | Camp | Jan. 9, 1951 |
| 2,722,262 | Eaton et al. | Nov. 1, 1955 |